Patented Aug. 29, 1950

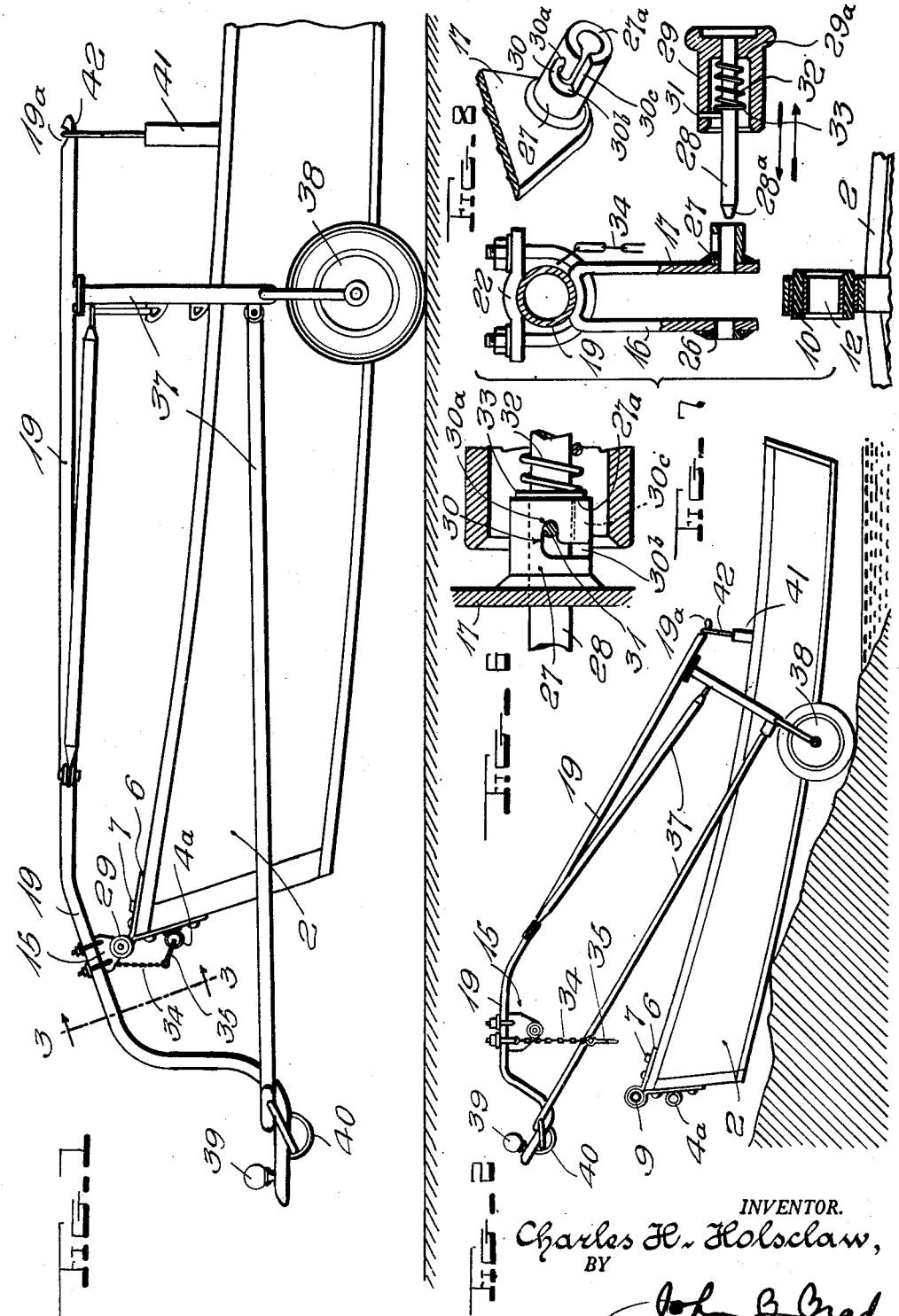

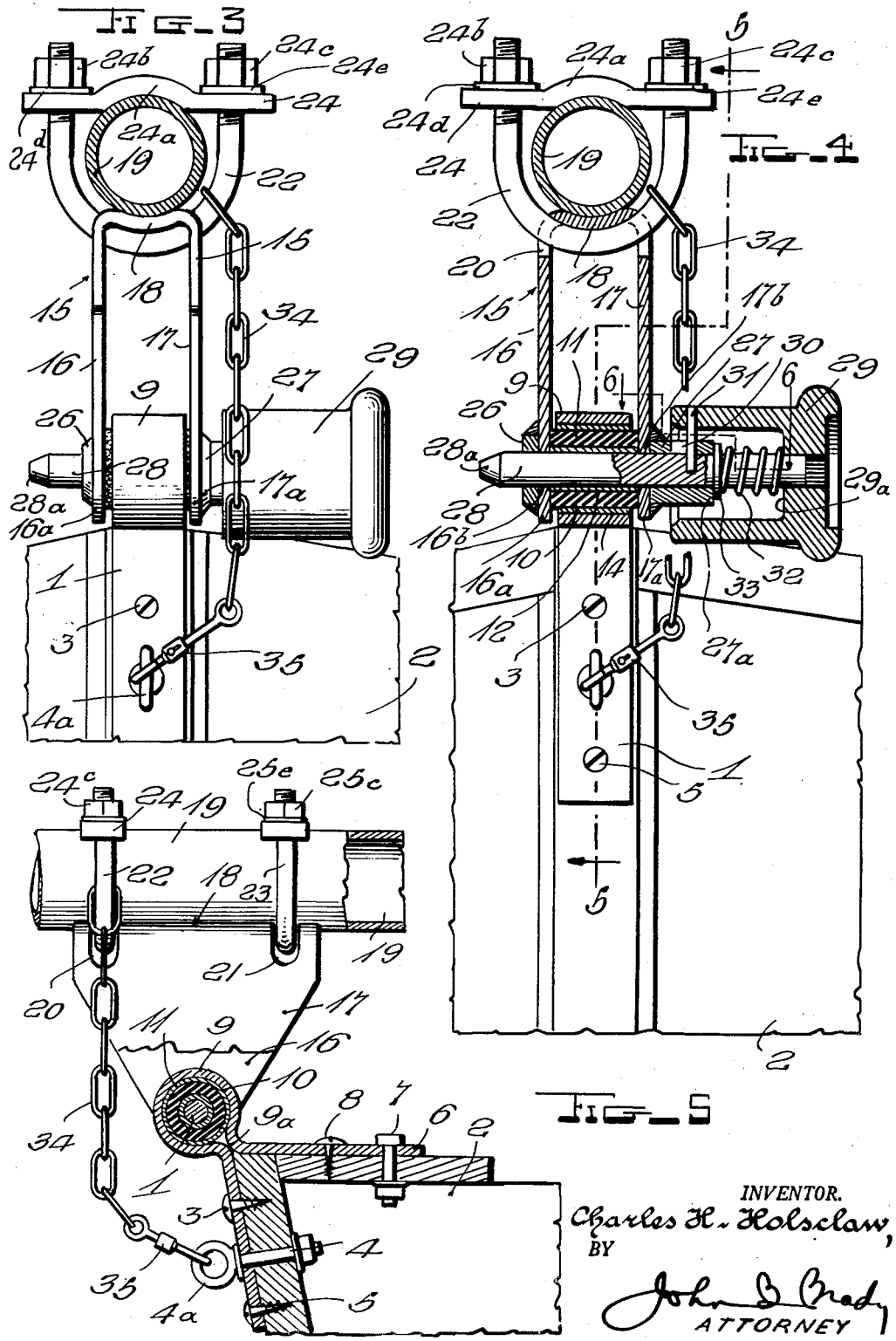

2,520,144

UNITED STATES PATENT OFFICE 2,520,144

BOW UNIT FOR SUSPENDING A BOAT FROM A TRAILER

Charles H. Holsclaw, Evansville, Ind.

Application September 16, 1948, Serial No. 49,525

11 Claims. (Cl. 9—1)

My invention relates broadly to improvements in trailers for boat handling, and more particularly to a construction of bow hanger for suspending a boat from a trailer.

One of the objects of my invention is to provide an improved construction of bow hanger for suspending a boat from a trailer by which a detachable connection may be readily made with a fitting secured to the bow of the boat.

Another object of my invention is to provide an improved construction of hardware for association with the bow of a boat for facilitating the suspension of the boat from the trailer.

A further object of my invention is to provide a construction of bow suspension unit for interconnecting a trailer with a boat including a shock absorbing suspension means for cushioning the suspension of the boat during transport.

Another object of my invention is to provide a construction of readily attachable and detachable bow suspension unit for mounting a boat with respect to a trailer in which a spring actuated manually operative pin is readily inserted or removed from the bow suspension unit to form the coupling means.

Other and further objects of my invention reside in the construction of shock protected bow suspension unit for suspending a boat from a trailer, as set forth more fully in the specification hereinafter following by reference to the accompanying drawings, in which:

Figure 1 is a fragmentary side elevational view of a boat suspended from a boat trailer by the bow hanger of my invention; Fig. 2 illustrates the detached position of the bow hanger on the boat trailer with respect to the bow of the boat in a launching and retrieving operation; Fig. 3 is a vertical sectional view taken substantially on line 3—3 of Fig. 1 and showing the bow hanger in front elevation; Fig. 4 is a substantially central vertical sectional view through the bow hanger and illustrating the detachment means in vertical section; Fig. 5 is a vertical sectional view taken substantially on line 5—5 of Fig. 4; Fig. 6 is a fragmentary horizontal sectional view taken substantially on line 6—6 of Fig. 4; Fig. 7 is a view showing the juxtaposed relation of the bow hanger and the bow mount plate assembly and the coupling means therefor; and Fig. 8 is a perspective view of a fragmentary portion of the bow hanger and the securing means for the detachable coupling means for connecting the bow hanger and the mount plate assembly.

My invention is directed to an improved construction of bow suspension unit for mounting a boat from a trailer. A particular feature of my invention is the arrangement of parts for the bow suspension unit by which quick attachment and detachment of the boat with respect to the trailer may be effected, at the same time providing a shock absorbing mounting for the boat for protection of the boat during transportation. I provide a bow mount plate assembly which is fastened permanently to the bow of the boat which is to be transported by trailer. The bow mount plate assembly includes a shock mount to which connection may be made through a bow hanger assembly. The bow hanger assembly is detachably connectable with the bow mount plate assembly. The bow hanger assembly is connected to the drawbar of the trailer and is readily adjusted thereon for different length boats, thereby assuring balance of the boat within the trailer. A spring actuated pin assembly is insertable through the shock mount installed in the bow mount assembly and through the bow hanger assembly for interconnecting the bow hanger assembly and the bow mount assembly. A bayonet slot connecting means is provided for ensuring quick attachment and detachment of the bow hanger assembly with respect to the bow mount assembly.

I have found the structure of the bow hardware highly practical in construction and successful in operation, but I desire that it be understood that the structure shown is to be considered in the illustrative sense and not in the limiting sense.

Referring to the drawings in detail, the bow mount plate assembly is indicated by reference character 1 secured to the front of the bow of the boat 2 by bolt member 4 and screws 3 and 5. The bow mount assembly 1 has a rearwardly extending top portion 6 which connects to the top of the bow 2 by means of bolt 7 and screw 8. The vertically extending portion 1 of the bow mount assembly and the horizontally extending portion 6 of the bow mount assembly terminate at their junction in the bow mount cylindrical sleeve 9 extending on a horizontal axis. A welded transverse connection 9a is provided between cylindrical sleeve 9 and the vertically extending portion 1 and the horizontally extending portion 6 of the bow mount assembly so that the entire bow mount assembly can be formed from a single strip. The sleeve 9 forms a housing for the cylindrical shock mount 10. The shock mount 10 consists of the transversely extending resilient rubber sleeve 11 having a central inner bearing sleeve 12 and an outer cylindrical bearing sleeve 14. The outer cylindrical bearing sleeve 14 fits snugly within the bow mount cylindrical sleeve 9.

The bow hanger assembly which is secured to the drawbar of the trailer consists of the bracket 15 having a pair of depending spaced side portions 16 and 17 tapering to aligned apex portions 16a and 17a. The depending spaced side portions 16 and 17 are interconnected at their upper ends by a shaped recessed portion 18. The recessed portion 18 is curved to receive tubular drawbar 19 of the trailer.

Beneath the recessed portion of the bow hanger assembly I provide transversely disposed spaced slots 20 and 21. These slots permit the passage of the hanger U-bolts shown at 22 and 23. The U-bolts 22 and 23 are screw-threaded on each end thereof and pass through the hanger clamp bars 24 and 25 respectively. The hanger clamp bars are shaped as illustrated more clearly in Figs. 3, 4 and 7 to fit around the tubular drawbar 19 of the trailer as represented at 24a. The hanger U-bolt nuts 24b and 24c engage the screw-threaded ends of the hanger U-bolt 22 for clamping the bracket 15 to the trailer tubular drawbar 19 through hanger clamp bar 24. Similarly, nuts represented at 25c engage the ends of hanger U-bolt 23 for securing bracket 15 to the tubular drawbar 19. Washer members indicated at 24d, 24e and 25e are interposed between the securing nuts and the hanger clamp bars 24 and 25 as indicated in the drawings. The side portions 16 and 17 of the bracket 15 are each provided with laterally extending projections projecting in opposite directions in horizontal alignment, as represented at 26 and 27. The projections 26 and 27 have an axial bore extending therethrough in alignment with apertures 16b and 17b in the apex portions 16a and 17a of the side portions 16 and 17 of the bracket. The cylindrical shock mount 10, forming part of the bow mount plate assembly 1 and housed within bow mount cylindrical sleeve 9, fits between the side portions 16 and 17 of bracket 15 and may have the axial bore of the inner bearing sleeve 12 axially aligned with the center of the apertures 16b and 17b and the extensions 26 and 27 on the bracket. When so aligned, the coupling pin 28 extending from the hanger knob 29 may be inserted therethrough. Coupling pin 28 has a terminus 28a which is frusto-conical in shape for facilitating entry of the coupling pin through the projecting sleeve 29, the aperture 17b in side portion 17, the inner bearing 12 of the cylindrical shock mount 10, the aperture 16b in side portion 16 of bracket 15, and projection 26 on side portion 16.

The projecting sleeve 27 contains a bayonet slot 30 into which may be latched the radially extending pin 31 secured to the coupling pin 28. The radially extending pin 31 is resiliently maintained in engagement with the bayonet slot 30 by means of coil spring 32 which encircles the coupling pin 28 and exerts a continuous force against the inner end 29a of knob 29 and the washer member 33 which bears against annular end 27a of projecting sleeve 27. When inserted in position as illustrated in Figs. 3-6 the coil spring 32 continuously urges pin 31 into the notched recess 30a of the bayonet slot 30 for maintaining the coupling pin 28 in position. When, however, the coupling pin is removed, as represented in Figs. 2 and 7, the knob 29 is pushed inwardly sufficient to move pin 31 out of the recessed notch 30a and then revolved angularly through the transverse slot 30b and withdrawn longitudinally through the longitudinally extending slot 30c for thereby removing coupling pin 28. Under these conditions the coil spring 32 moves washer 33 into a position abutting pin 31. Pin 31 is secured at one end in the hollow sleeve forming knob 29 and at the other end in the pin 28, extending radially therebetween and operatively to slidably enter longitudinally extending slot 30c in sleeve 27 and to be revolved through slot 30b to enter the recessed notch 30a in effecting a latching operation.

I provide a safety chain 34 which interconnects the bow hanger assembly and the bow mount plate assembly. A safety chain 34 has an end loop thereon extending around the hanger U-bolt 22 with the opposite end thereof terminating in a spring latch hook 35 which is detachably connectable with the eyelet 4a of the bolt member 4 which passes through the bow mount plate assembly 1 and the bow of the boat 2. The safety chain 34 assures the suspension of the boat 2 from the trailer drawbar 19 in the event of accidental detachment of coupling pin 28. The boat 2 is protected from injury by the suspension afforded by the safety chain 34 in case of failure of the shock mount 10 to properly perform the suspension operation.

In Fig. 1 I have shown the boat 2 suspended from the trailer which includes drawbar 19 and the tubular frame structure represented at 37 terminating in supporting wheels 38. The front of the frame structure 37 of the trailer terminates in a hitch 39 for connection to the rear of an automobile. A skid 40 is provided at the front of the trailer frame. The boat 2 is provided with a spring suspension unit represented at 41 terminating in an eyelet 42 through which the hook shaped end 19a of the drawbar 19 is inserted for suspending the boat in yieldable position from the trailer frame. In Fig. 1 I have shown the bow mount plate assembly 1 and the bracket 15 of the bow hanger assembled in interconnected relation for carrying the boat 2 with respect to the trailer frame. In Fig. 2 I have shown the relationship of the bow mount plate assembly 1 and the bracket 15 of the bow hanger assembly with the bow 2 detached from the trailer frame preparatory to a launching operation or in preparation for a retrieving operation.

The arrangement described herein has been found highly practical and successful in operation, but I realize, however, that modifications and changes may be made, and I desire that it be understood that no limitations upon my invention are intended other than may be imposed by the scope of the appended claims.

What I claim as new and desire to secure by Letters Patent of the United States is as follows:

1. A boat suspension unit comprising in combination with a trailer frame, a boat having a bow mount plate assembly secured to the bow thereof and terminating in a cylindrical horizontally disposed sleeve, a bow hanger assembly secured to the trailer frame and terminating in a pair of side portions extending on opposite ends of the said cylindrical horizontally disposed sleeve of the bow mount plate assembly, and a detachable pin member insertable through and removable from said sleeve and the side portions of said bracket.

2. A suspension unit for mounting a boat with respect to a trailer frame comprising a bow mount plate assembly secured to a boat, said bow mount plate assembly terminating in a horizontally extending sleeve, a trailer frame, a bow hanger assembly depending from said trailer frame and including a bracket having side portions extending across opposite ends of said horizontally extending sleeve, and a coupling pin extendible through and retractable from the side portions of said bracket and the internal bore of said sleeve.

3. Suspension means for boats comprising in combination with a trailer frame, a boat having a bow mount plate assembly secured thereto and terminating in a substantially horizontally disposed sleeve member, a bow hanger assembly secured to said trailer frame and having side portions projecting across opposite ends of the horizontally disposed sleeve member of said bow mount plate assembly, a cylindrical shock mount arranged within said sleeve and a coupling pin insertable into and retractable from the side portions of said bow hanger assembly and the interior bore of said cylindrical shock mount.

4. Suspension means for boats comprising in combination with a trailer frame, a boat having a bow mount plate assembly secured thereto and terminating in a substantially horizontally disposed sleeve member, a bow hanger assembly secured to said trailer frame and having side portions projecting across opposite ends of the horizontally disposed sleeve member of said bow mount plate assembly, a cylindrical shock mount arranged within said sleeve, a coupling pin insertable into and retractable from the side portions of said bow hanger assembly and the interior bore of said cylindrical shock mount, and a flexible chain interconnecting said bow hanger assembly and said bow mount plate assembly.

5. Suspension means for boats comprising in combination with a trailer frame, a boat having a bow mount plate assembly secured thereto and terminating in a substantially horizontally disposed sleeve member, a bow hanger assembly secured to said trailer frame and having side portions projecting across opposite ends of the horizontally disposed sleeve member of said bow mount plate assembly, a cylindrical shock mount arranged within said sleeve, a coupling pin insertable into and retractable from the side portions of said bow hanger assembly and the interior bore of said cylindrical shock mount, and spring means for latching said coupling pin with respect to said bow mount plate assembly and said bow hanger assembly.

6. Suspension means for mounting a boat from a boat trailer comprising a bracket having a pair of spaced substantially parallel and depending side portions interconnected by a central portion, said central portion being recessed to receive the trailer frame, U-bolts extending through said bracket and operating to clamp said bracket with respect to the trailer frame, a bow mount plate assembly attached to the bow of a boat and terminating in a horizontally disposed tubular member, said tubular member having a length adapted to enter between the parallel side portions of said bracket, and a horizontally extending detachable pin for interconnecting said tubular member with the side portions of said bracket.

7. Suspension means for mounting a boat from a boat trailer comprising a bracket having a pair of spaced substantially parallel and depending side portions interconnected by a central portion, said central portion being recessed to receive the trailer frame, U-bolts extending through said bracket and operating to clamp said bracket with respect to the trailer frame, a bow mount plate assembly attached to the bow of a boat and terminating in a horizontally disposed tubular member, said tubular member having a length adapted to enter between the parallel side portions of said bracket, a tubular shock mount disposed within said tubular member and having a horizontally extending bore aligned with apertures in the depending sides of said bracket and an attachable and detachable pin extendible through the apertured sides of said bracket and the horizontally extending bore of said shock mount.

8. Suspension means for mounting a boat from a boat trailer comprising a bracket having a pair of spaced substantially parallel and depending side portions interconnected by central portion, said central portion being recessed to receive the trailer frame, U-bolts extending through said bracket and operating to clamp said bracket with respect to the trailer frame, tubular projecting members secured to the opposite exterior faces of said plates and aligned with apertures therein, a bow mount plate assembly terminating in a horizontally extending sleeve, a tubular shock mount carried by said sleeve and operative to enter between the spaced parallel sides of said bracket, said shock mount having a central aperture therethrough alignable with the tubular members carried by said side plates, and a spring actuated coupling pin projectable through said tubular members, the apertures in said side plates, and through said tubular shock mount for interconnecting said bow hanger assembly and said bow mount plate assembly.

9. Suspension means for mounting a boat from a boat trailer comprising a bracket having a pair of spaced substantially parallel and depending side portions interconnected by a central portion, said central portion being recessed to receive the trailer frame, U-bolts extending through said bracket and operating to clamp said bracket with respect to the trailer frame, tubular projecting members secured to the opposite exterior faces of said side portions and aligned with apertures therein, a bow mount plate assembly terminating in a horizontally extending sleeve, a tubular shock mount carried by said sleeve and operative to enter between the spaced parallel sides of said bracket, said shock mount having a central aperture therethrough alignable with the tubular members carried by said side portions, and a spring actuated coupling pin projectable through said tubular members, the apertures in said side portions, and through said tubular shock mount for interconnecting said bow hanger assembly and said bow mount plate assembly, one of said tubular projecting members having a bayonet slot therein, and a readily disposed pin carried by said coupling pin and detachably latchable within said bayonet slot.

10. Means for suspending a boat from a trailer comprising a bracket depending from a trailer frame and terminating in a pair of spaced parallel extending side portions, a bow mount plate assembly secured to the bow of a boat and terminating in a horizontally extending sleeve projectable between the parallel extending side portions, a tubular shock mount carried within said sleeve and having a horizontally extending axial bore therein adapted to be aligned with apertures in said spaced parallel extending side portions, a tubular extension on one of said side portions, a coupling pin having an internally recessed manually engageable knob on one end thereof terminating in a pin insertable through said tubular extension on one of said side portions, and through the apertures in said side portions and the tubular shock mount between said side portions, a coil spring carried by said pin within the recessed knob attached thereto and operative against the end of said tubular extension, a bayonet slot in said tubular extension and a pin member extending between said pin and one side of said recessed knob and operative to engage said bayonet slot under control of said spring means for detachably latching said bow hanger assembly with said bow mount plate assembly.

11. A bow mount plate assembly for boats comprising a metallic strip having horizontally and vertically extending portions secured to the bow of a boat with a loop formed at the junction thereof, a tubular shock mount secured within said loop and extending on a substantially horizontal axis, a trailer frame, a bow hanger assembly depending from said frame and having side portions extending across opposite ends of said tubular shock mount, and a pin detachably engageable through the side portions of said bow hanger assembly and through said tubular shock mount for supporting said bow mount plate assembly with respect to said bow hanger assembly.

CHARLES H. HOLSCLAW.

No references cited